United States Patent [19]

Lombard et al.

[11] 4,381,678
[45] May 3, 1983

[54] PRESSURE PICK-UP, ESPECIALLY FOR MEASURING THE INTAKE PRESSURE OF INTERNAL COMBUSTION ENGINES

[76] Inventors: Claude Lombard, 60 rue Corneille, 78150 Le Chesnay; Christian Rousseau, 6 allee Suzanne, 92160 Antony, both of France

[21] Appl. No.: 244,874

[22] Filed: Mar. 18, 1981

[30] Foreign Application Priority Data

Mar. 21, 1980 [FR] France .................. 80 06310

[51] Int. Cl.³ .............................. G01L 9/10
[52] U.S. Cl. ...................... 73/728; 73/722; 336/30
[58] Field of Search .............. 73/728, 722, 155; 336/30

[56] References Cited

U.S. PATENT DOCUMENTS

| | | | |
|---|---|---|---|
| 2,564,221 | 8/1951 | Hornfeck | 73/722 |
| 2,740,941 | 3/1956 | Kelly | 73/728 |
| 2,922,971 | 1/1960 | Jeglum | 336/30 |
| 3,800,258 | 3/1926 | Moulds . | |
| 4,161,886 | 7/1924 | Eshelman . | |
| 4,174,638 | 11/1979 | Zabler | 73/728 |
| 4,300,396 | 11/1981 | Buckshaw | 73/728 |

FOREIGN PATENT DOCUMENTS

2617576 11/1977 Fed. Rep. of Germany .
2377614 1/1977 France .
2394075 6/1978 France .
2406184 10/1978 France .
394659 1/1961 Switzerland .

*Primary Examiner*—Donald O. Woodiel
*Attorney, Agent, or Firm*—Oblon, Fisher, Spivak, McClelland & Maier

[57] ABSTRACT

A pick-up for the intake pressure of a combustion engine of the type with a flexible membrane and electrical translation of the displacement of the membrane, including a spring acting against the member, an adjustment mechanism for positioning the spring acting against the membrane, a guiding tube for the spring serving as a stop for the membrane, a closed magnetic casing made of ferrite including nested cylinders pierced by a hole at each end of their axes, a central ferrite magnetic core connected to the membrane and penetrating the closed magnetic casing, an insulating bobbin disposed within the casing, a single winding placed on the insulating bobbin around the core and covering a major portion of the core in its deepest position, the bobbin further including cylindrical ends extending beyond the magnetic casing on opposite sides thereof so as to form an air pocket between the core and the casing and guide the core in the casing, and an oscillating electronic circuit connected to the winding which includes a variable pressure/frequency translator.

14 Claims, 8 Drawing Figures

PRESSURE PICK-UP, ESPECIALLY FOR MEASURING THE INTAKE PRESSURE OF INTERNAL COMBUSTION ENGINES

BACKGROUND OF THE INVENTION

1. Field of the Invention

This invention relates to a pressure pick-up especially for measuring the intake pressure of internal combustion engies, designed so as to facilitate the control of significant parameters. This design makes it possible either to accept wide ranges of differences in the physical and mechanical characteristics of the various pieces making up the pick-up for a given range of the functional electrical reading/pressure ratio, or simply to modify the functional ratio, at a low cost, without changing the definition of the various pieces used to make the pick-up.

2. Description of the Prior Art

The principle has long been known of a pressure pick-up or pressure variation pick-up in which a piece made of a magnetic material cooperates with a bobbin and follows the movements of a flexible membrane which covers a cavity subjected to pressure or change in pressure to be measured. Different modes of manufacture have been proposed on the basis of this principle.

It is known that, for various applications in automobile electronics, it is worthwhile to know with a high degree of precision the intake pressure of an internal combustion engine. Among such applications reference may be made to integral electronic ignition, electronic fuel injection, or gauges indicating economical driving.

In the case of electronic ignition, used here as an example of application, a problem arises if there is a desire to mount the same computer on a full line of vehicles, due to the fact that the cartography of the laws of ignition advance as a function of intake pressure varies from one type of vehicle to the next. In addition, the same problem arises on the same type of vehicle if there is a desire to modify slightly, without changing the computer, the law for adjusting the ignition advance as a function of ignition pressure either to take account of variations in the characteristics of the motor during its life or to take into account short-term or local changes in the composition of fuels. In order to reduce the cost of parts such as an electronic computer, therefore, it is widely known that there is an interest, on the one hand, in producing large volumes of identical parts and, on the other hand, in avoiding the need for storage, especially in the distribution network, of a large number of computers which are far more costly than pick-ups.

A further difficulty arises if the ignition advance law for a given engine must be defined with great precision, which is especially the case for those motors which have little protection from pinging for the law considered. This implies, usually with respect to the pressure parameter, the use of costly pick-ups.

SUMMARY OF THE INVENTION

The objective of the present invention is to eliminate these difficulties by virtue of the adjustments it makes possible and, to this end, the invention concerns a pressure measurement capsule including a flexible membrane for transforming pressure into a force which is opposed by a spring whose position and initial compression may be adjusted axially, bringing about the displacement of a central ferrite core in a magnetic ferrite casing containing a single insulating, cylindrical bobbin while a known type of negative input resistance amplifier, wired to the said bobbin equipped with the tuning condenser, transforms the changes in self inductance produced by the displacement of the central core into changes in frequency.

The pressure pick-up according to the invention has the advantage that the position of the casing, in the form of two nested cylinders containing the bobbin, may be adjusted axially with respect to the position of the core for a given initial pressure, making it possible to adjust the initial self inductance of the bobbin to a certain extent and to therefore adjust the initial frequency corresponding to the initial pressure. In addition, the position of the bobbin within the magnetic casing may also be adjusted axially the length of the central core, which, by changing the initial position of the bobbin with respect to the core and the distribution in the bobbin of the flux leakage between the said core and the said casing, modifies the law of variation of the self inductance, and hence of the frequency, thereby permitting adjustment of the slope of the functional frequency/pressure ratio provided by the pick-up according to the invention.

It is also advantages for the tuning condenser to be integrated with the pick-up, as the dispersions of the value of the condenser may be made up for by the adjustment of the initial self inductance without it being necessary to make any adjustments on the completed electronic ignition module.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
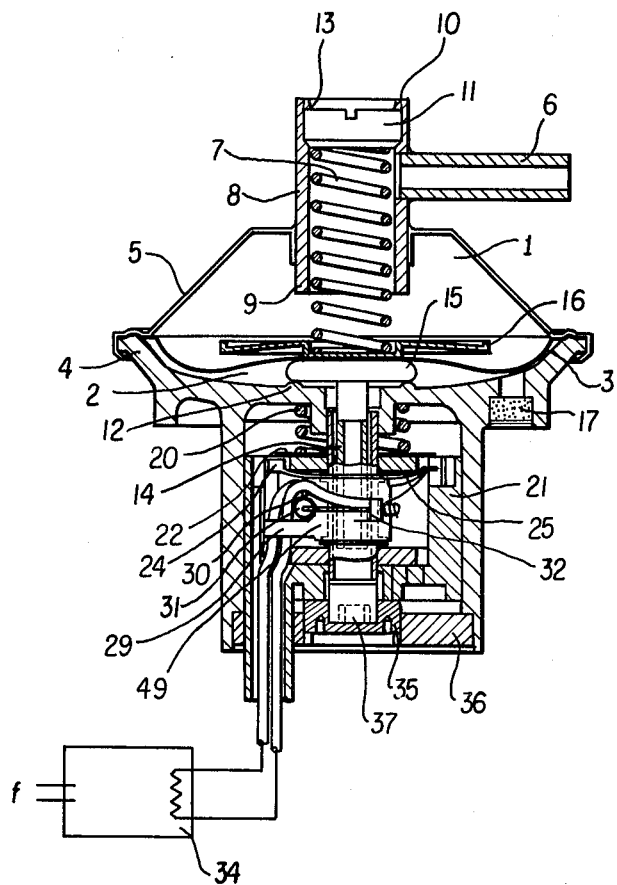
FIG. 1 represents a pressure pick-up according to the invention in longitudinal cross section.

Following the representation in FIG. 1, the pressure pick-up a front chamber 1 and a rear chamber 2 separated by a membrane 3 mounted in a setting between the body 4 and the cap 5. Chamber 1 is tied into the intake manifold of an internal combustion engine, (not shown), by means of a connecting tube 5.

Chamber 1 contains a spring 7 which is guided externally by a tube 8 whose end 9 acts as a stop for the mebrane 3 and whose tapped end 10 receives a threaded stopper 11 which makes possible adjustment of the position of the spring 7, allowing for the mounting of springs with a rather large dispersion of free lengths. Stopper 11 also makes it possible to adjust the precompression force of the spring 7 on the membrane 3 maintained in position against the body 4 which features a form of stop 12, so that for any pressure less than a predetermined value, no displacement of the membrane may be observed. The seal of chamber 1 is ensured, on the one hand, by the seating of the membrane 3 between the cap 5 and the body 4, and, on the other hand, by depositing a known sealing product 13 on the threaded stopper 11. The displacement of the membrane 3 is transmitted to a central ferrite core 14 attached to a membrane pushrod 15, made of a piece and airtight at the center of the membrane by using a setting, of the gyroscopic type for example, on a cupel 16, so that the membrane 3 is pinched during setting between the said cupel 16 and the pushrod 15.

The rear chamber 2 is connected with outside atmosphere through a known type of load loss pneumatic filter 17 so that the pneumatic rigidity of the chamber 2 is generally negligable in comparison with the rigidity of the spring 7 and membrane 3 combination and so that no pneumatic and thermal effects in the chamber disturb the operation of the pick-up.

The central ferrite core 14 moves within a closed magnetic casing made of ferrite in the form of two nested half cylinders, the casing being made of two parts 18 and 19, which may or may not be identical, each of which has a hole at each end along its axis and is held in place by a pressure spring 20 in a cylindrical support 21 centered within the body 4. In cases where the magnetic casing 18, 19 is conducting, an insulating washer 22 is inserted between the pressure spring 20 and the casing.

Inside the magnetic casing 18, 19 is a bobbin 23 made of a flexible insulating material which is provided with two wings 24 and 25 used as the stop for the wire of the single winding 26 and to hold the bobbin in position inside the magnetic casing. Ends 27 and 28 of the bobbin 23 center it within the magnetic casing 18, 19, itself centered within the body by means of a support 21. There is thus a pocket of air between the core 14 and the casing 18, 19 formed by the thickness of the ends 27 and 28 of the bobbin 23. These ends 27 and 28 simultaneously guide the displacement of the membrane by centering the core 14.

Figure 7:
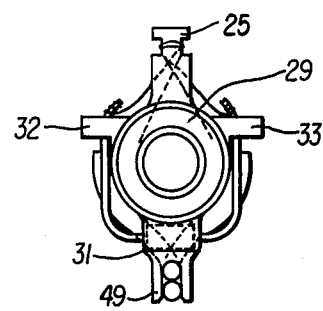
FIG. 7 represents a top view of the mounting of the tuning condenser on the bobbin and the wiring of the connections and FIG. 8 represents a variant of the pick-up according to the invention in which the spring may work to pull as well as to compress.

Clipped onto the bobbin 23 is a plastic piece 29 with a cylindrical interior, represented in greater detail in FIG. 7, provided with a fork 30 in which is mounted a tuning condenser 31 for the winding 26 and with two small wings 32 and 33. The output wires from the winding 26 are coiled and then soldered to the connections of the condenser 31 which has previously been passed through two small holes in the small wings. The output wires of the pick-up are simultaneously soldered to the connections of the condenser 31 and wired to an amplifying circuit with negative input resistance 34 so as to make up a variable pressure/frequency translator. These output wires are held in place by a second fork 49.

The position of the support 21 of the magnetic casing 18,19 containing the bobbin 23 with its winding 26 may be adjusted axially, with respect to the central core 14 held in a given position, by an adjustment screw 35 screwed into an adjustment head 36 set in the rear portion of the body 4. Pressure spring 20 holds the magnetic casing 18, 19 in its support 21 against the said adjusting screw.

The position of the bobbin 23 may be adjusted within the casing 18, 19 along the length of the central core 14 by a second adjusting screw 37 which is coaxial to the first 35. The small wings 24 and 25 of the bobbin, supported against the cylinder 18 of the magnetic casing, keep the end 29 of the bobbin against the adjustment device 37. A braking mechanism of the acrylic resin type keeps screw 35 from turning when the position of the bobbin 23 is adjusted by means of screw 37.

The mode of opertion of the pick-up according to the invention is as follows: the flexible membrane 3 transforms the pressure applied against the pick-up against the spring 8 into force. A relationship between the force applied to the spring by the membrane is represented by way of example in FIG. 4. The form of this relationship may be modified by changing the nature and physical characteristics of the membrane 3, the dimensions of the cupel 16, the geometry of the cap 5, especially the angle it makes with the seating plane, and finally the rigidity of the spring 7, in as much as it modifies the operating point of the membrane for a given pressure.

This force applied to the spring 7, with a rigidity selected in advance, moves the central core 14 within the magnetic casing 18, 19 containing the bobbin 23, whose winding 26 is connected to the oscillating circuit 34. The displacement of the core 14 modifies the inductance of the winding 26 by changing the effective permeability along the axis of the bobbin 23. The variation in the inductance of the winding 26 as a function of the displacement of the core 14 is reflected in a variation in the frequency of the signal given off by the amplifying circuit with negative input resistance 34, a variation whose form is represented by way of example in FIG. 5.

In order to obtain a given relationship between the displacement of the core 14 and the frequency of the electronic circuit 34, the dimensions of the coil 23 can be changed such as the coil window and the initial diameter of the winding 26, the number of spires and the diameter of the wire in the winding, the dimensions of the holes pierced in the nested cylinders 18 and 19, and finally the diameter and magnetic characteristics of the central core 14. These elements are listed merely as indications and are not restrictive.

Figure 3:
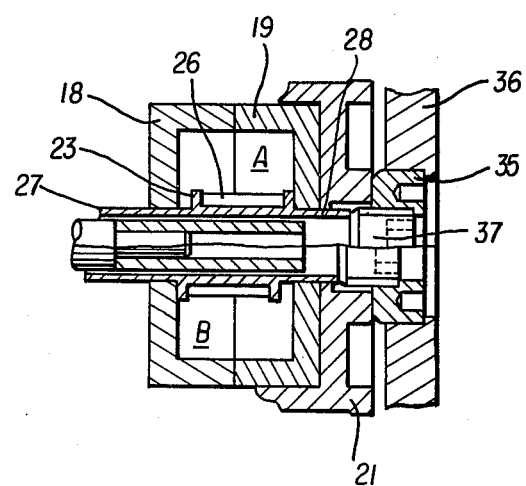
FIG. 3 represents two half sections A and B, in a larger scale, of the adjustable bobbin in position in the closed magnetic casing, with the cross section being along line III—III of FIG. 2 and only the key parts being shown.
Figure 5:
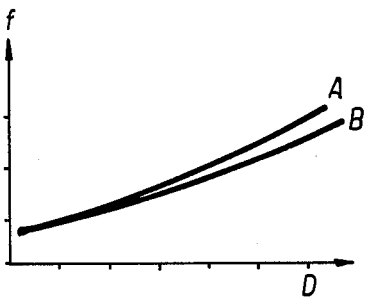
FIG. 5 represents the characteristic curve of the transformation displacement D/frequency L for two positions A and B of the bobbin.

The average slope of this relationship may be adjusted continuously by modifying the position of the bobbin 23 in the magnetic casing 18, 19. FIG. 5 represents the curves A and B corresponding to the extreme positions A and B of the bobbin 23 in FIG. 3.

Figure 4:
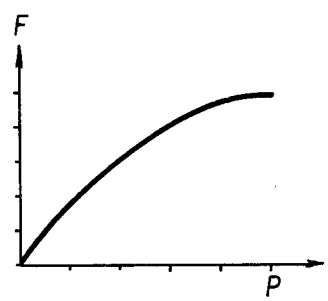
FIG. 4 represents the characteristic curve of the transformation pressure P/force F.
Figure 6:
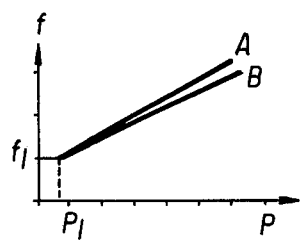
FIG. 6 represents the characteristic curve of the functional relationship frequency L/pressure P provided by the pick-up for positions A and B of the bobbin.

The force/pressure transformations and frequency/displacement transformations represented in the aforementioned FIGS. 4 and 5 may be selected such that the functional frequency/pressure relationship is roughly linear for a frequency ratio of 1 to 2, as represented by way of example in FIG. 6. The frequency L1 may be adjusted by the screw 35 which moves the casing 18, 19 containing the bobbin 23 with its winding 26 with respect to the central core 14, held in a given position, which modifies the inductance of the winding. The pressure P1 may be selected by adjusting the initial pressure of the spring 8 using the threaded stopper 12.

The slope between the values A and B of the relationship may be continuously adjusted by positioning the bobbin 23 within the casing 18, 19 by means of adjusting screw 37.

Figure 2:
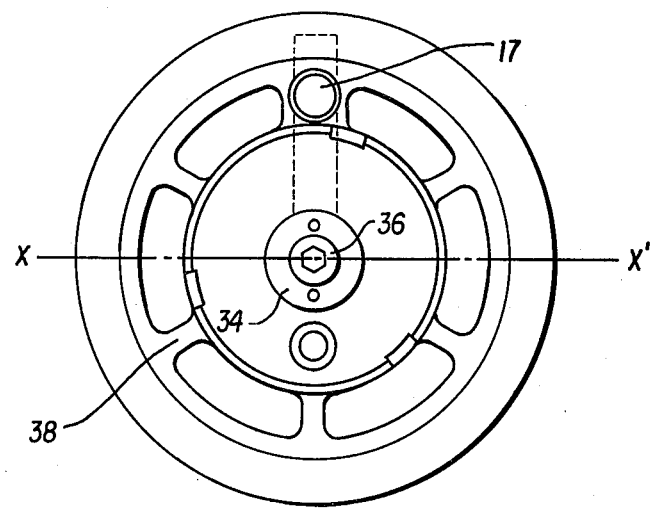
FIG. 2 represents the same unit viewed from below.

The stability of the frequency response of the pick-up according to the invention as a function of temperature may be predetermined by selecting dimensions of the body 4 and the support 21 for given thermal expansion coefficients. The use of light material for making the body 4 may be retained by improving the rigidity of the said body by means of the reinforcement vanes 38 represented in FIG. 2.

Figure 8:
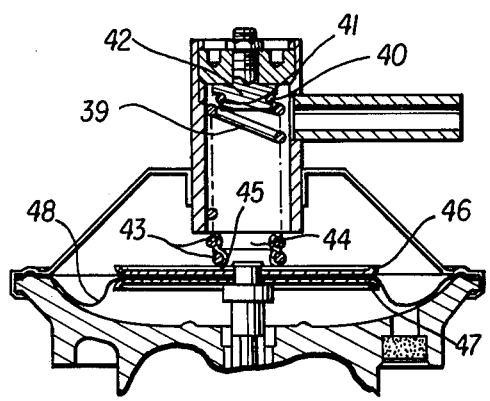

FIG. 8 shows a second embodiment of the pick-up according to the invention, in which the spring 39 may function as needed in either the pulling or pressing mode. By way of nonrestrictive example, spring 39 is attached at one of its aids, where there is a reduction in the diameter of its winding 40 in a recess 41 in the spring's composite adjustment stopper 42. At its other end, spring 39 has contiguous spirals and precompressed areas 43, screwed onto a threaded sleeve 44 with a hollow portion 45 in which the spring is crimped so as to immobilize it.

This sleeve 44 is made of a piece with two cupels 46 and 47 grasping the flexible membrane 48 subjected to the pressure.

The mode of actuation of the pressure pick-up in FIG. 8 resembles that of the pick-up in FIG. 1 as, in both cases, the displacement of the membrane brings about an identical displacement of the core. However, this form of manufacture may be mounted without any prestressing and makes it possible to select an initial position which is not stopped.

Other variants of manufacture are possible, especially the use of opposing springs located on both sides of the membrane.

What is claimed as new and desired to be secured by Letters Patent of the United States is:

1. A pick-up for the intake pressure of a combustion engine of the type with a flexible membrane and electrical translation of the displacement of the membrane comprising:
   a spring acting against the membrane;
   an adjustment mechanism for positioning the spring acting against the membrane;
   a guiding tube for the spring serving as a stop for the membrane;
   a closed magnetic casing made of ferrite comprising nested cylinders pierced by a hole at each end of their axes;
   a central ferrite magnetic core connected to the membrane and penetrating said closed magnetic casing;
   an insulating bobbin disposed within said casing;
   a single winding placed on said insulating bobbin around the core and covering a major portion of the core in its deepest position, said bobbin further comprising cylindrical ends extending beyond the magnetic casing on opposite sides thereof so as to form an air pocket between the core and the casing and guide the core in the casing; and
   an oscillating electronic circuit connected to said winding which comprises a variable pressure/frequency translator.

2. A pick-up according to claim 1, further comprising axial position adjustment means for adjusting the position for a given pressure, of the magnetic casing and bobbin unit with respect to the ferrite core.

3. A pick-up according to claims 1 or 2, further comprising a pressure spring and wherein the closed magnetic casing comprises a first and second part, nested against one another and against the adjustment mechanism by said pressure spring.

4. A pick-up according to claims 1 or 2, means for axially adjusting the position of the bobbin within the casing.

5. A pick-up according to claim 4, wherein the adjusting means comprises a first and second adjusting screw for the casing and bobbin positions are coaxial and further comprising means for braking the first screw in relation to the second screw.

6. A pick-up according to claim 4 wherein the flexible plastic bobbin comprises first and second wings at one end portion thereof supported against the inside of the casing to stop the bobbin against the adjustment mechanism.

7. A pick-up according to claim 1 further comprising a tuning condenser for the winding and a plastic cylindrical piece having a first fork member attached to the tuning condenser of the winding, a first and second wing member and a second fork for establishing wiring with the winding output, condenser, and output wiring connections.

8. A pick-up according to claim 1, further comprising a cap containing the membrane, a magnetic circuit, and a body containing the magnetic circuit wherein the cap is seated on the body and comprises a light and rigid material with a predetermined coefficient of dilation and further comprises a plurality of reinforcing vane for increased rigidity, and further comprising a plastic support with a predetermined coefficient of dilation and thickness inserted between the body and the magnetic circuit.

9. A pick-up according to claim 1, wherein said means of adjusting the spring comprises a screw placed at an end portion thereof, such that under predetermined pressure conditions, said screw contacts the membrane with a predetermined force against an opposite wall forming a stop.

10. A pick-up according to claim 1, wherein said means of adjusting said spring further comprises means for fixing the spring without play at opposite end portions thereof.

11. A pick-up according to claim 1 further comprising a pneumatic fiber having a predetermined loss load and a compartment situated behind the membrane so as not to be subjected to engine intake pressure and which is connected to atmosphere by said pneumatic filter.

12. A pick-up according to claim 1 further comprising a first and second spring situated on opposite sides of the membrane to position the membrane.

13. A pick-up according to claim 10, wherein said fixing means comprises a recess formed in the adjusting means at a first end portion of the spring, a threaded sleeve formed on the membrane at a second end portion of the spring.

14. A pick-up according to claim 10, wherein said fixing means comprises a threaded sleeve formed on the membrane at a second end portion of the spring.

* * * * *

UNITED STATES PATENT AND TRADEMARK OFFICE
CERTIFICATE OF CORRECTION

PATENT NO. : 4,381,678
DATED      : May 3, 1983
INVENTOR(S) : Claude Lombard et al It is certified that error appears in the above-identified patent and that said Letters Patent is hereby corrected as shown below:

On the title page insert:

-- [73] Assignee: REGIE NATIONALE DES USINES RENAULT
BOULOGNE BILLANCOURT - FRANCE --

Signed and Sealed this

Twenty-third Day of August 1983

[SEAL]

Attest:

GERALD J. MOSSINGHOFF

Attesting Officer

Commissioner of Patents and Trademarks